SEMICONDUCTOR APPARATUS

Filed June 27, 1957

INVENTOR.
ARLON D. KOMPELIEN
BALTHASAR H. PINCKAERS
BY Omund R. Dahle
ATTORNEY

United States Patent Office 2,888,627

Patented May 26, 1959

2,888,627

SEMICONDUCTOR APPARATUS

Arlon D. Kompelien, Richfield, and Balthasar H. Pinckaers, Hopkins, Minn., assignors to Minneapolis-Honeywell Regulator Company, Minneapolis, Minn., a corporation of Delaware Application June 27, 1957, Serial No. 668,447

13 Claims. (Cl. 321—9)

This invention relates generally to improved transistor modulator or chopper apparatus for converting minute direct current signals to alternating type signals having a phase and magnitude dependent upon the polarity and magnitude of the D.C. signal. In the application of a transistor modulator circuit for converting D.C. to A.C. for connection to the input of a transistor amplifier, it has been discovered that the modulator should be designed so that the output of the modulator presents a constant impedance to the input of the amplifier. Across the input electrodes of a transistor amplifier there is normally a small D.C. bias potential, which potential may vary considerably with temperature. If the modulator output circuit, which is connected to the input of the amplifier, presents a varying impedance to this D.C. bias potential, the bias potential of the amplifier will also be chopped, and this may cause drift with temperature in the control point of the system. By the use of two or more transistor choppers in the modulator circuit it is theoretically possible to maintain the output impedance of the modulator constant. This invention provides an improved and novel transistor modulator circuit of this type, and an improvement over the basic transistor modulator disclosed in the co-pending application of Balthasar H. Pinckaers, Serial No. 465,008, filed October 27, 1954, and assigned to the same assignee as the present invention.

It is an object of this invention to provide a new and improved transistor modulator circuit for converting minute D.C. signals to alternating current type signals in which the modulator circuit is in the form of a bridge circuit.

It is a further object of this invention to provide a new and improved transistor modulator circuit which has a substantially constant output impedance.

These and other objects of the invention will be understood upon consideration of the accompanying specification, claims and drawings of which:

Figures 1, 2:
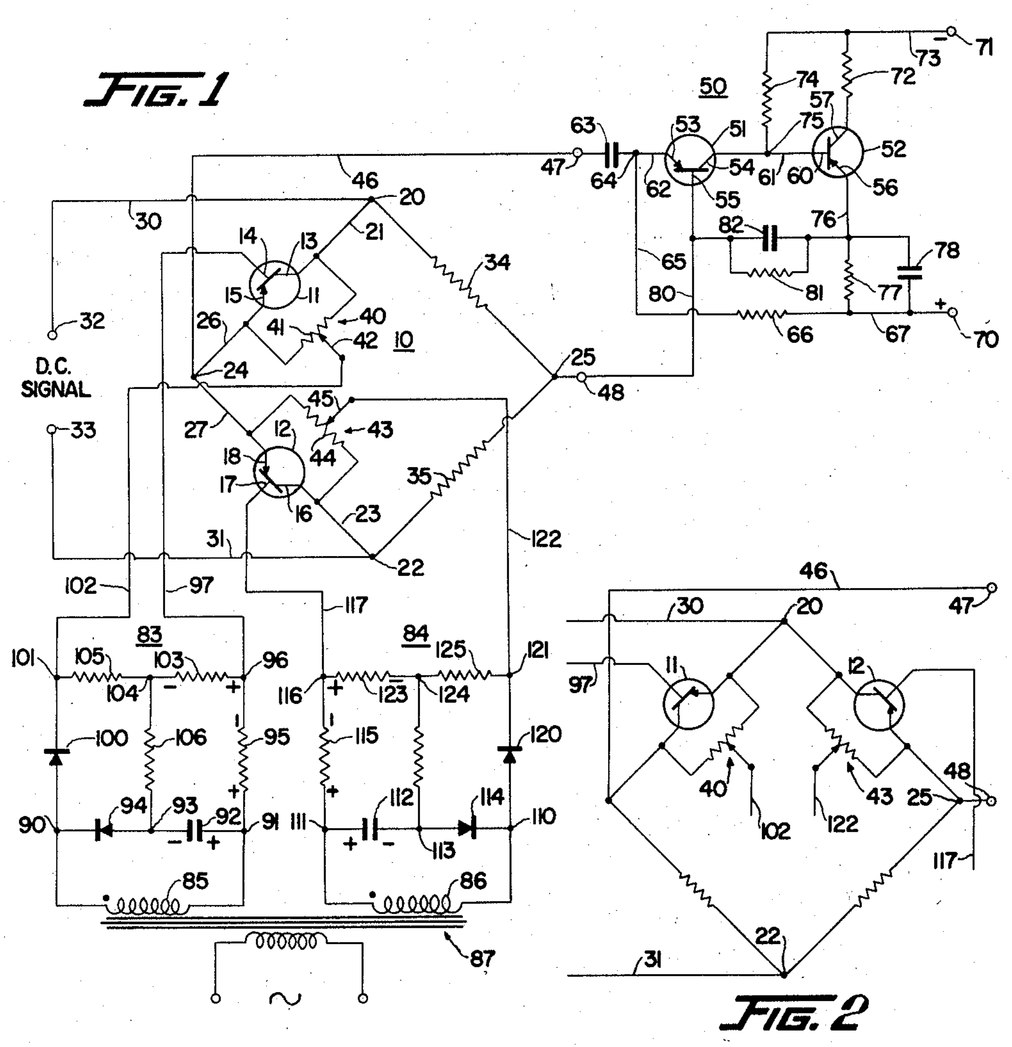
Figure 1 is a schematic representation of an embodiment of the invention.
Figure 2 is a modification of Figure 1.

Referring now to Figure 1 there is disclosed a bridge type modulator 10 which includes a pair of transistors 11 and 12. The transistors which form two legs of the bridge are preferably of the symmetrical junction type but any other suitable transistor may be used. Transistor 11 has a collector electrode 13, a base electrode 14, and an emitter electrode 15. Transistor 12 has a collector electrode 16, a base electrode 17, and an emitter electrode 18. The collector electrode 13 is connected by a conductor 21 to an input junction 20 of the bridge type circuit. The collector electrode 16 is connected by a conductor 23 to another input junction 22 of the bridge. The bridge type circuit 10 also has a pair of output junctions 24 and 25. The emitter electrodes 15 and 18 are connected by conductors 26 and 27, respectively, to the output junction 24. The bridge input junctions 20 and 22 are connected by conductors 30 and 31, respectively to D.C. signal input terminals 32 and 33. A pair of low impedance resistors 34 and 35 connect the input junctions 20 and 22, respectively, to the output junction 25. A potentiometer 40 is connected across transistor 11 from collector 13 to emitter 15. The potentiometer 40 has an impedance element 41 and an associated adjustable wiper contact 42. A similar potentiometer 43 having an impedance element 44 and an adjustable wiper contact 45 is connected across the transistor 12 from collector 16 to emitter 18.

The output junction 24 is connected by a conductor 46 to an input terminal 47, of a pair of input terminals 47 and 48, of a transistor amplifier 50, and the bridge output junction 25 is directly connected to the terminal 48. The amplifier 50 comprises a pair of transistors 51 and 52 and the associated components. Transistor 51 has an emitter electrode 53, a collector electrode 54, and a base electrode 55. The transistor 52 has an emitter electrode 56, a collector electrode 57, and a base electrode 60. The collector 54 is directly connected by a conductor 61 to the base 60 of transistor 52. The emitter 53 is connected by a conductor 62 and a coupling capacitor 63 to the amplifier input terminal 47. A junction 64 on the conductor 62 is connected by a conductor 65, a resistor 66, and a conductor 67 to a positive supply terminal 70. The collector electrode 57 is connected through a load device 72 and a conductor 73 to a negative supply terminal 71. A battery or other suitable energizing source, not shown, may be connected intermediate the terminals 70 and 71. A resistor 74 connects a junction 75 on the conductor 61 to the conductor 73. The emitter 56 is connected by a conductor 76 and the parallel combination of a resistor 77 and a capacitor 78 to the conductor 67. The base electrode 55 is connected by a conductor 80 to the input terminal 48. The base electrode 55 is coupled to the emitter 56 by the parallel combination of a resistor 81 and a capacitor 82.

Bias producing circuits 83 and 84 are connected, respectively, to the transistors 11 and 12 for alternately and oppositely biasing the transistors from low impedance to a high impedance condition. The bias producing circuits 83 and 84 are energized, respectively, by secondary windings 85 and 86 of transformer 87. The primary winding of the transformer 87 is energized from a suitable source of alternating current. The secondary winding 85 has terminals 90 and 91, and the terminal 91 is connected through a capacitor 92, a junction 93 and a rectifying element 94, such as a junction diode, to the terminal 90. The terminal 91 is also connected through a resistor 95, a junction 96, and a conductor 97 to the base electrode 14 of transistor 11. The terminal 90 is connected through a rectifying diode 100, a junction 101, and a conductor 102 to the wiper contact 42 of potentiometer 40. The junction 96 is connected by a resistor 103, a junction 104 and a resistor 105 to the junction 101. A resistor 106 interconnects the junctions 93 and 104.

The secondary winding 86 has terminals 110 and 111, and the terminal 111 is connected through a capacitor 112, a junction 113 and a rectifying element 114 to the terminal 110. The terminal 111 is also connected through a resistor 115, a junction 116, and a conductor 117 to the base electrode 17 of the transistor 12. The terminal 110 is connected through a rectifying diode 120, a junction 121 and a conductor 122 to the wiper contact 45 of potentiometer 43. The junction 116 is connected by a resistor 123, a junction 124, and a resistor 125 to the junction 121. A resistor 126 interconnects the junctions 113 and 124.

*Operation*

In considering the operation of the modulator circuit it will be noted that the input terminals 20 and 22 of the bridge modulator 10 are adapted to be connected to a source of direct current signal potential at terminals 32 and 33. This direct current signal potential, which may be variable in magnitude and reversible in polarity, may be the output from any condition responsive apparatus such as a temperature responsive impedance bridge circuit, a thermocouple circuit, a potentiometric circuit or any other suitable signal producing means. It is desired to convert the direct current signal potential, which may be of a magnitude in the order of microvolts, to an A.C. type potential having a phase determined by the polarity of the signal potential and of a magnitude proportional to the signal magnitude.

In order to convert the direct current potential to an alternating type potential, the two transistors 11 and 12 are alternately switched from a high impedance condition to a very low impedance condition. For example, the collector to emitter impedance in the low impedance condition may be in the order of 2 ohms while in the high impedance condition it may be in the order of a megohm. The switching is accomplished by the two bias producing circuits 83 and 84, which are effective to vary the conductivity, respectively, of the transistors 11 and 12.

Figure 3:
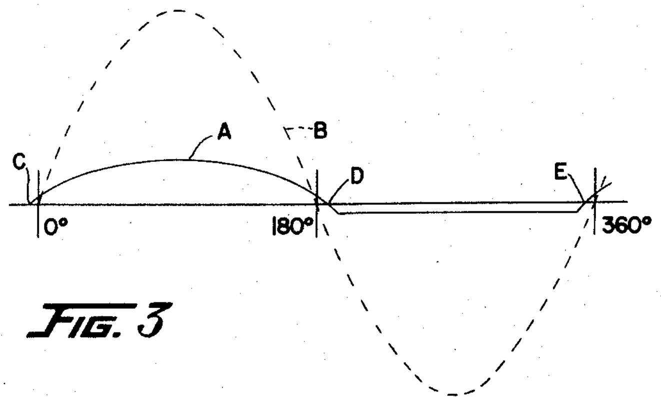
Figure 3 is a plot of several wave forms in the modulator.

The transformer is energized from an A.C. source and sine wave potentials are induced in the secondary windings 85 and 86 of the transformer 81, as shown in curve B of Figure 3. These potentials are then modified before being applied to the transistor, and the modified potential wave shape is shown as curve A of Figure 3. Curve A represents the wave shape of the potential on conductor 102 with respect to conductor 97. Curve A is also representative of the wave shape of the potential on conductor 122 with respect to conductor 117, however, in the second case the phase on the conductors 122 and 117 is displaced 180° from the curve A as shown.

Considering now the sine wave on winding 85, it will be noted that during the half cycle when terminal 90 is negative with respect to 91, current flows from the winding through capacitor 92 and junction diode 94 to charge the capacitor, with the capacitor plate adjacent terminal 91 being positive. A discharge path for the capacitor 92, which discharge path has a relatively long time constant can be traced from the positive capacitor terminal through the series connected resistors 95, 103, and 106 to the negative capacitor terminal. Due to the relatively long time constant a relatively constant D.C. potential exists across the resistor 95 and 103 when rectifying diode 100 is not conducting. This relatively constant potential across resistor 103 causes a small reverse potential to be applied through the conductors 102 and 97 to the base electrode 14 of transistor 11 and to the collector and emitter electrode by means of the potentiometer 40. This is disclosed in Figure 3 as the flat portion of curve A between points D and E and may be in the order of 0.5 volt. No other potential exists here during the portion of the curve since diode 100 is biased in the reverse direction. Since during this portion of the cycle the base electrode 14 is maintained positive with respect to the emitter and collector, the transistor remains in a high impedance condition.

A relatively constant component of potential also exists across the resistor 95, due to the discharge path of capacitor 92 above described, which potential is of a polarity such that the end of the resistor adjacent terminal 91 is positive, as is shown in the legend on the drawing. This D.C. potential is additive to the half cycle of the energization when terminal 90 is made positive with respect to terminal 91 due to the potential induced on winding 85, and by this means this half cycle is effectively extended to slightly more than 180° as is shown in curve A of Figure 3 between points C and D.

During this half cycle when terminal 90 is positive with respect to 91, a current path may be traced from terminal 90 through junction diode 100, conductor 102, adjustable wiper contact 42 of potentiometer 40 and then in two parallel paths comprising opposite ends of the impedance element 41 of potentiometer 40 to the collector and emitter junctions of transistor 11, through the collector and emitter junctions to the base electrode 14, through conductor 97, and resistor 95 back to the terminal 91. The forward current flow to the base electrode through both the collector and emitter junctions biases the transistor into a low impedance region so that the impedance between the collector and emitter is reduced to a very low value, in the order of 2 ohms. This low impedance is realizable because of the proximity of the collector and emitter junctions in the junction transistor. The portion of curve A between points C and D is representative of the potential from the bias producing means to the transistor during this half cycle of operation.

The bias produced by network 84 is the same as above discussed for network 83, however, the phase relationship is displaced by 180° so that transistor 12 is made conductive when transistor 11 is a high impedance and vice versa. It will be noted from a consideration of the wave shape of curve A that each of the transistors is designedly made conductive for a portion of the cycle greater than 180°. This will be discussed in greater detail below.

Considering now the bridge circuit formed by transistors 11 and 12 and resistors 34 and 35, let it be assumed that a small D.C. signal potential is applied at input terminals 32 and 33 such that terminal 32 is positive. A current path may be traced from the terminal 32 through the conductor 30 to the bridge junction 20 where the current path divides, one portion flowing through resistors 34, output junction 25 and resistor 35, and the second portion flowing through transistors 11, output junction 24 and transistor 12 to the junction 22, and then back through conductor 31 to the source terminal 33. The resistors 34 and 35 are each preferably a relatively low value, for example 10 ohms.

The output potential from the bridge modulator 10 output junctions 24 and 25, appears at the amplifier input terminals 47 and 48. This potential is an A.C. type potential. Since the transistors 11 and 12 are alternately and oppositely made to appear as a low impedance and then a high impedance, the bridge modulator is constantly unbalanced. Let us consider the half cycle of operation when transistor 11 is biased into the low impedance condition and transistor 12 is biased into the high impedance condition. Assuming as before that a D.C. signal potential is applied at input terminals 32 and 33, the potential at the modulator output junction 25 will be midway between the potential on input terminal 33 and input terminal 32 with the resistors 34 and 35 being of equal value. The potential at the modulator output junction 24, however, will approach the potential at input terminal 32 since there is substantially no impedance presented by transistor 11 with respect to the impedance presented by transistor 12. The potential at the amplifier input terminal 47 will be positive therefore with respect to terminal 48. During the succeeding half cycle, the potential at amplifier input terminal 48 will remain unchanged, but since the transistor 12 is now conductive and transistor 11 is in a high impedance condition the potential on modulator output junction 24 will approach the potential on input terminal 33 and therefore the potential on amplifier input terminal 47 will be negative with respect to the input terminal 48. If the polarity of the D.C. signal potential is reversed, the respective phase of the A.C. type output signal will also be reversed.

Both potentiometers 40 and 43 which are connected across transistors 11 and 12 must be adjusted so that with zero D.C. input (at terminals 32 and 33) there is minimum A.C. output at the modulator bridge output terminals 24 and 25.

The transistor amplifier 50 which comprises the two directly coupled transistors 51 and 52, discloses the transistor 51 connected in the common base configuration and the transistor 52 connected in the common emitter configuration. The common base configuration of transistor 51 provides a circuit having a relatively low input impedance between the emitter 53 and the base electrode 55 to match the impedance of the modulator. As is normal in class A transistor circuits, a small D.C. bias exists between the emitter electrode 53 and the base electrode 55 to provide a quiescent current flow in the transistor 51. In the past considerable difficulty in obtaining stable operation has been encountered in attempting to connect the output of a transistor modulator circuit to the input of a transistor amplifier. This is because with previously available transistor modulator circuits the impedance looking back into the modulator circuit from the output terminals was not constant but varied as the modulator switched from one condition to another. This variation in output impedance of the modulator actually was effective to chop or modulate the quiescent D.C. bias on the input of the amplifier stage. Since the input bias potential between the emitter and base is extremely temperature sensitive, any tendency to chop the bias potential due to varying impedance of the modulator causes a shift in control point of the system with temperature change.

In this invention great care was taken to provide a modulator or chopper circuit in which the output impedance would remain constant throughout the operating cycle. Looking back into the modulator circuit from the terminals 47 and 48, the several advantages of this circuit become readily apparent. Since the bias producing circuits 83 and 84 have been intentionally designed so that each of the transistors is biased into its low impedance condition for slightly more than half of the operating cycle, there is no instant of time during which both of the transistors are in a high impedance region.

A brief consideration of the operation of transistors will show that since a finite forward bias is necessary to bias the transistors into a low impedance region, it becomes necessary to design a bias producing circuit which provides a sufficient forward bias at the 0° and at the 180° point of the cycle, as shown in Figure 3, so that current will be flowing in both the collector and emitter junctions at this point of the cycle and thus assure that one or the other of the transistors is at all times conductive. It should now be readily apparent that this cannot be accomplished by mere half wave rectification of a sine wave since there will be brief periods at the beginning and ends of the cycle where neither transistor will be conductive and a high output impedance will exist across the modulator terminal 47 and 48. Since no instant of time exists when either transistor 11 or transistor 12 is not in a low impedance condition, the impedance looking back into the modulator of this invention is always relatively low and constant.

Another advantage of the bridge modulator circuit is that the noise output of the bridge circuit is very low. It is well known in transistor chopper circuits generally, that it is during periods when the transistor is biased into its high impedance condition that maximum noise is generated in the transistor, and that when it is in a low impedance or conductive state substantially no noise is generated by the transistor. In the present circuit which is specifically designed so that one or the other of the transistors is always conductive, it can be seen that the conductive transistor and the resistors 35 and 34 present a low impedance shunt across the non-conductive transistor to maintain the noise level at a very low value throughout the entire cycle. Also the ability of the biasing networks to produce a constant low voltage bias in the reverse direction as shown by the flat portion of curve A in Figure 3, helps minimize noise when the transistor is in the high impedance state.

In the circuit of Figure 2 there is shown a modification of the modulator bridge of Figure 1 in which one of the resistors and one of the transistors are inter-changed in position. Design considerations determine to a large extent whether the bridge of Figure 1 or of Figure 2 should be used. In a design consideration for obtaining the maximum transfer of energy from the source to the amplifier, it appears that if the output impedance of the modulator and the amplifier input impedance are approximately equal there is little advantage in one circuit over the other, however, if the amplifier input impedance is substantially larger than the modulator impedance, the circuit of Figure 2 appears to be better, and it it is lower, the circuit of Figure 1 is better.

It should be noted that while Figures 1 and 2 disclose the use of two transistors in the modulator bridge circuit, it is possible to use more transistors in which case higher conversion efficiencies could be obtained.

Many changes and modifications of this invention will undoubtedly occur to those who are skilled in the art and we therefore wish it to be understood that we intend to be limited by the scope of the appended claims and not by the specific embodiments of our invention which are disclosed herein for the purpose of illustration only.

We claim:

1. Electrical signal converter apparatus having a relatively constant output impedance comprising; first and second semiconductor amplifying means, each of said semi-conductor amplifying means having a plurality of electrodes including a collector, an emitter, and a control electrode; first and second impedance means; impedance bridge means having input and output terminals, said bridge means comprising said semiconductor means and said impedance means, said first and second semiconductor means being connected in adjacent legs of said bridge means; means for connecting said input terminals to a source of signal potential of variable magnitude; first and second characterized bias potential producing means, each of said bias producing means providing successively during each cycle a reverse bias potential and a forward bias potential, the forward bias continuing for more than one half of the operating cycle, the bias of said first means being out of phase with said second means; and coupling means connecting said first and second bias producing means, respectively, intermediate the control electrode, and the emitter and collector electrodes of said first and second semiconductor amplifying means.

2. Electrical signal converter apparatus having a relatively constant output impedance comprising; first and second transistor amplifying means, each of said transistor means having a plurality of electrodes including a collector, an emitter, and a control electrode; first and second impedance means; impedance bridge means having input and output terminals, said bridge means comprising said transistor means and said impedance means, said first and second transistor means being connected in adjacent legs of said bridge means; means for connecting said input terminals to a source of signal potential of variable magnitude; first and second characterized bias potential producing means, each of said bias producing means providing successively during each cycle a reverse bias potential and a forward bias potential, the forward bias continuing for more than one half of the operating cycle, the bias of said first means being out of phase with the bias potential of said second means; and coupling means connecting said first and second bias producing means, respectively, intermediate the control electrode, and the emitter and collector electrodes of said first and second transistor amplifying means, so that the bias potentials are effective to alternately and oppositely bias said transistors from a conductive to a non-conductive state.

3. Electrical signal converter apparatus having a relatively constant output impedance comprising: first and second electroresponsive switching means, each of said electroresponsive means having a plurality of electrodes including a pair of output electrodes, and a control electrode; first and second impedance means; impedance bridge means having input and output terminals, said bridge means comprising said electroresponsive switching means and said impedance means, said first and second electroresponsive means output electrodes being connected in adjacent legs of said bridge means; means for connecting said input terminals to a source of signal potential of variable magnitude; first and second characterized bias potential producing means, each of said bias producing means providing successively during each cycle a reverse bias potential and a forward bias potential, the forward bias continuing for more than one half of the operating cycle, the bias of said first means being out of phase with the bias potential said second means; and coupling means connecting said first and second bias producing means, respectively, intermediate the control electrode, and the output electrodes of said first and second electroresponsive switching means, so that the bias potentials are effective to alternately and oppositely switch said electroresponsive switching means from a conductive to a non-conductive state.

4. Electrical signal converter apparatus having a relatively constant output impedance comprising: first and second semiconductor amplifying means, each of said semiconductor amplifying means comprising a plurality of electrodes including a collector, an emitter and a control electrode; means for producing a direct current potential which is variable in magnitude and reversible in polarity in response to a condition; first and second impedance means; impedance bridge means having input and output terminals, said bridge means comprising said first and second semiconductor means and said first and second impedance means; means for connecting said bridge input terminals to said direct current potential producing means; means connecting the bridge output terminals to alternating signal potential utilizing means; bias producing means for producing potentials having modified alternating type character, said bias producing means having a first pair of output terminals comprising first and second terminals and a second pair of output terminals comprising third and fourth terminals, said bias producing means producing during each cycle reverse bias potentials and forward bias potentials, the forward bias potentials extending for more than one half of the operating cycle period, the potential at said first pair of output terminals being produced out of phase with the potential at said second pair of output terminals; and coupling means connecting the first and third terminals, respectively, to the control electrode of said first and second semiconductor amplifying means, and connecting the second terminal to the collector and emitter electrodes of said first semiconductor means and connecting the fourth terminal to the collector and emitter of said second semiconductor means.

5. Electrical signal converter apparatus having a relatively constant output impedance comprising: first and second transistor means, each of said transistor means comprising a plurality of electrodes including a collector, an emitter and a control electrode; means for producing a direct current potential which is variable in magnitude and reversible in polarity in response to a condition; first and second impedance means; impedance bridge means having input and output terminals, said bridge means comprising said first and second transistor means and said first and second impedance means; means for connecting said bridge input terminals to said direct current potential producing means; means connecting the bridge output terminals to alternating signal potential utilizing means; bias producing means for producing potentials having modified alternating type character, said bias producing means having a first pair of output terminals comprising first and second terminals and a second pair of output terminals comprising third and fourth terminals, said bias producing means producing successively during each cycle reverse bias potentials and forward bias potentials, the forward bias potentials extending for more than one half of the operating cycle period, the potential at said first pair of output terminals being produced out of phase with the potential at said second pair of output terminals; and coupling means connecting the first and third terminals, respectively, to the control electrode of said first and second transistor means, and connecting the second terminal to the collector and emitter electrodes of said first transistor means and connecting the fourth terminal to the collector and emitter of said second transistor means.

6. Electrical direct current to alternating current converter apparatus having a relatively constant output impedance comprising: first and second electroresponsive switching means, each of said electroresponsive means comprising a plurality of electrodes including a pair of output electrodes and a control electrode; means for producing a direct current potential which is variable in magnitude and reversible in polarity in response to a condition; first and second impedance means; impedance bridge means having input and output terminals, said bridge means comprising said first and second electroresponsive means and said first and second impedance means; means for connecting said bridge input terminals to said direct current potential producing means; means connecting the bridge output terminals to alternating signal potential utilizing means; bias producing means for producing potentials having modified alternating type character, said bias producing means having a first pair of output terminals comprising first and second terminals and a second pair of output terminals comprising third and fourth terminals, said bias producing means producing during each cycle reverse bias potentials and forward bias potentials, the forward bias potentials extending for more than one half of the operating cycle period, the potential at said first pair of output terminals being produced out of phase with the potential at said second pair of output terminals, and coupling means connecting the first and third terminals, respectively, to the control electrode of said first and second electroresponsive means, and connecting the second terminal to the output electrodes of said first electroresponsive means and connecting the fourth terminal to the output electrodes of said second electroresponsive means.

7. Bridge configuration converter apparatus having a relatively constant output impedance for converting minute electrical direct current signals to alternating current comprising: bridge type circuit means having a plurality of legs and having direct current input terminals and alternating current output circuit means; first and second semi-conductor switching means, each of said semi-conductor switching means having a plurality of electrodes including output electrodes and a control electrode, the impedance of said semi-conductor switching means output electrodes being controllable from a relatively high value to a relatively low value as a function of the signal applied to said control electrode; said output electrodes of said first and second semi-conductor means being connected, respectively, in adjacent legs of said bridge means; means for producing a direct current potential in response to a condition; means for connecting said bridge input terminals to said direct current potential producing means; bias producing means for producing switching potentials having modified alternating type character, said bias producing means having a first and a second output circuit, said bias producing means producing successively during each cycle reverse bias potentials and forward bias potentials, the forward bias potentials continuing for more than one-half of the operating cycle period, the bias potential of said first output circuit being produced out of phase with the potential of said second output circuit; and coupling means connecting the first and second output circuits, respectively, to the control electrodes of said first and second semi-conductor means, so that the bias potentials are effective to alternately and oppositely switch said semi-conductor means from a conductive to a non-conductive state, whereby the conduction periods of said semi-conductor means overlap one another so that there is no period of time during which neither of the semiconductor means are conducting.

8. Bridge converter apparatus having a relatively constant output impedance comprising: bridge type circuit means having direct current input terminals and alternating current output circuit means; first and second transistor switching means, each of said transistor switching means having a plurality of electrodes including output electrodes and a control electrode, the impedance of said transistor switching means being controllable from a relatively high value to a relatively low value as a function of the signal applied to said control electrode; said output electrodes of said first and second transistor means being connetced, respectively, in adjacent legs of said bridge means; means for producing a variable direct current potential in response to a condition; means for connecting said bridge input terminals to said direct current potential producing means; bias producing means for producing potentials having modified alternating type character, said bias producing means having a first and a second output circuit, said bias producing means producing successively during each cycle reverse bias potentials and forward bias potentials, the forward bias potentials continuing for more than one-half of the operating cycle period, the bias potential of said first output circuit being produced out of phase with the potential of said second output circuit; and coupling means connecting the first and second output circuits respectively, to the control electrodes of said first and second transistor means, so that the bias potentials are effecive to alternately and oppositely switch said transistor means from a conductive to a non-conductive state, whereby the conduction periods of said transistor overlap one another such that there is no period of time during which neither of the transistor means are conducting.

9. Direct current to alternating current converter apparatus having a relatively constant output impedance comprising: bridge type circuit means having at least four legs and having direct current input terminals and alternating current output circuit means; first and second semi-conductor switching means, each of said semi-conductor switching means having a plurality of electrodes including output electrodes and a control electrode, the impedance of said semi-conductor switching means across said output electrodes being controllable from a relatively high value to a relatively low value as a function of the signal applied to said control electrode; said output electrodes of said first and second semi-conductor means being connected, respectively, in adjacent legs of said bridge means; impedance means connected in the remainder of said legs, means for producing a direct current potential; means for connecting said bridge input terminals to said direct current potential producing means; bias producing means for producing potentials having modified alternating type character; said bias producing means having a first output circuit and a second output circuit, said bias producing means producing successively during each cycle reverse bias potentials and forward bias potentials, the forward bias potentials continuing for more than one-half of the operating cycle period, the bias potential of said first output circuit being produced out of phase with the potential of said second output circuit; and coupling means connecting the first and second output circuits, respectively, to the control electrodes of said first and second semi-conductor means, so that the bias potentials are effective to alternately and oppositely switch said semi-conductor means from a conductive to a non-conductive state, whereby the conduction periods of said semi-conductor means overlap one another such that there is no period of time during which neither of the semi-conductor means are conducting.

10. Direct current to alternating current signal converter apparatus comprising: impedance bridge means having an input circuit and an output circuit, said bridge means comprising first and second semi-conductor switching means, each of said semi-conductor switching means having a plurality of electrodes including control and output electrodes; the output electrodes of said first and second semi-conductor switching means being connected, respectively, in adjacent legs of said bridge means; means for providing switching potentials to control the conductivity of said semi-conductor switching means, said switching potentials being connected in an out of phase relationship, respectively, to the control electrodes of said first and second semi-conductor means, said means providing a characterized switching potential which is effective to maintain each of said semi-conductor devices conductive during more than half of the operating cycle, so that the conducting periods of the first and second semi-conductor means overlap.

11. Direct current to alternating current signal converter apparatus comprising: impedance bridge means having an input circuit and an output circuit, said bridge means comprising first and second transistor switching means, each of said transistor switching means having a plurality of electrodes including control and output electrodes; the output electrodes of said first and second semi-conductor switching means being connected, respectively, in adjacent legs of said bridge means; means for providing switching potentials to control the conductivity of said transistor switching means; said switching potentials being connected in an out of phase relationship, respectively, to the control electrodes of said first and second transistor means, said means providing a characterized switching potential which is effective to maintain each of said transistor means conductive during more than half of the operating cycle, so that the conducting periods of the first and second transistor means overlap.

12. Direct current to alternating current signal converter apparatus comprising: first and second semiconductor amplifying means, each of said semiconductor means having a plurality of electrodes including a collector, an emitter, and a control electrode; first and second impedance means; impedance bridge means having first and second input terminals and first and second output terminals; said bridge means comprising said semiconductor means and said impedance means, the emitter and collector electrodes of said first semiconductor being interconnected between said first input terminal and said first output terminal, the collector and emitter electrode of said second semiconductor being connected intermediate said first output terminal and said second input terminal, said first impedance means being interconnected between said first input terminal and said second output terminal, said second impedance means being connected between said second output terminal and said second input terminal; said input terminals being connected to a source of direct current signal potential; and bias producing means connected to the control electrodes of said semiconductor means, said bias producing means being energized from a source of alternating current potential and providing biasing potentials in an out of phase relationship to said first and second semiconductor means, each of which biasing potentials is effective to maintain the respective semiconductor means conductive for more than one half of the operating cycle, so that the conducting periods of said semiconductor means overlap one another whereby the output impedance of said converter apparatus is maintained relatively constant.

13. Direct current to alternating current signal converter apparatus comprising: first and second transistor switching means, each of said transistor means having a plurality of electrodes including a control and switching electrodes; first and second impedance means; impedance bridge means having first and second input terminals and first and second output terminals, said bridge means comprising said transistor means and said impedance means, the switching electrodes of said first transistor means being interconnected between said first input terminal and said first output terminal, the switching electrodes of said second transistor means being connected intermediate said first output terminal and said second input terminal, said first impedance means being interconnected between said first input terminal and said second output terminal, said second impedance means being connected between said second output terminal and said second input terminal; said input terminals being connected to a source of direct current signal potential; and bias producing means connected to the control electrodes of said transistor means, said bias producing means being energized from a source of alternating current potential and providing output biasing potentials in an out of phase relationship to said first and second transistor means, each of which biasing potentials is effective to maintain the respective transistor means conductive for more than one half of the operating cycle, so that the conducting period of said transistor means overlap one another whereby the output impedance of said converter apparatus is maintained relatively constant.

References Cited in the file of this patent

UNITED STATES PATENTS

| | | |
|---|---|---|
| 2,566,981 | Clapp | Sept. 4, 1951 |
| 2,783,380 | Bonn | Feb. 26, 1957 |
| 2,783,384 | Bright et al. | Feb. 26, 1957 |
| 2,787,712 | Priebe et al. | Apr. 2, 1957 |